US005191354A

United States Patent [19]

Quate

[11] Patent Number: 5,191,354

[45] Date of Patent: Mar. 2, 1993

[54] METHOD AND APPARATUS FOR SUPPRESSING CAPILLARY WAVES IN AN INK JET PRINTER

[75] Inventor: Calvin F. Quate, Stanford, Calif.

[73] Assignee: Xerox Corporation, Stamford, Conn.

[21] Appl. No.: 838,617

[22] Filed: Feb. 19, 1992

[51] Int. Cl.[5] ........................ G01D 9/00; G01D 15/16

[52] U.S. Cl. ................................ 346/1.1; 346/140 R

[58] Field of Search ............................ 346/140 R, 1.1

[56] References Cited

U.S. PATENT DOCUMENTS

| | | | |
|---|---|---|---|
| 4,112,433 | 9/1978 | Vernon | 346/140 R X |
| 4,697,193 | 9/1987 | Hawkins | 346/1.1 |
| 4,719,476 | 1/1988 | Elrod et al. | 346/140 R |
| 4,719,480 | 1/1988 | Elrod et al. | 346/140 R |
| 4,743,924 | 5/1988 | Scardovi | 346/140 R |
| 4,746,929 | 5/1988 | Lin et al. | 346/75 |
| 4,748,461 | 5/1988 | Elrod | 346/140 R |
| 4,751,529 | 6/1988 | Elrod et al. | 346/140 R |
| 4,751,530 | 6/1988 | Elrod et al. | 346/140 R |
| 4,751,533 | 6/1988 | Saito et al. | 346/140 R |
| 4,751,534 | 6/1988 | Elrod et al. | 346/140 R |
| 4,782,350 | 11/1988 | Smith et al. | 346/140 R |
| 4,797,693 | 1/1989 | Quate | 346/140 R |
| 4,801,953 | 1/1989 | Quate | 346/140 R |
| 5,122,818 | 6/1992 | Elrod et al. | 346/140 R |

*Primary Examiner*—Benjamin R. Fuller
*Assistant Examiner*—David Yockey
*Attorney, Agent, or Firm*—Rosen, Dainow & Jacobs

[57] ABSTRACT

The ejection of droplets in an ink jet printer is accompanied by the generation of capillary waves that spread out radially from the central region where the drops are ejected. These capillary waves interfere with the ejection of succeeding droplets. In order to suppress these capillary waves, the pressure in the pool of liquid feeding the printer is varied periodically at twice the maximum repetition rate of droplet ejection.

11 Claims, 1 Drawing Sheet

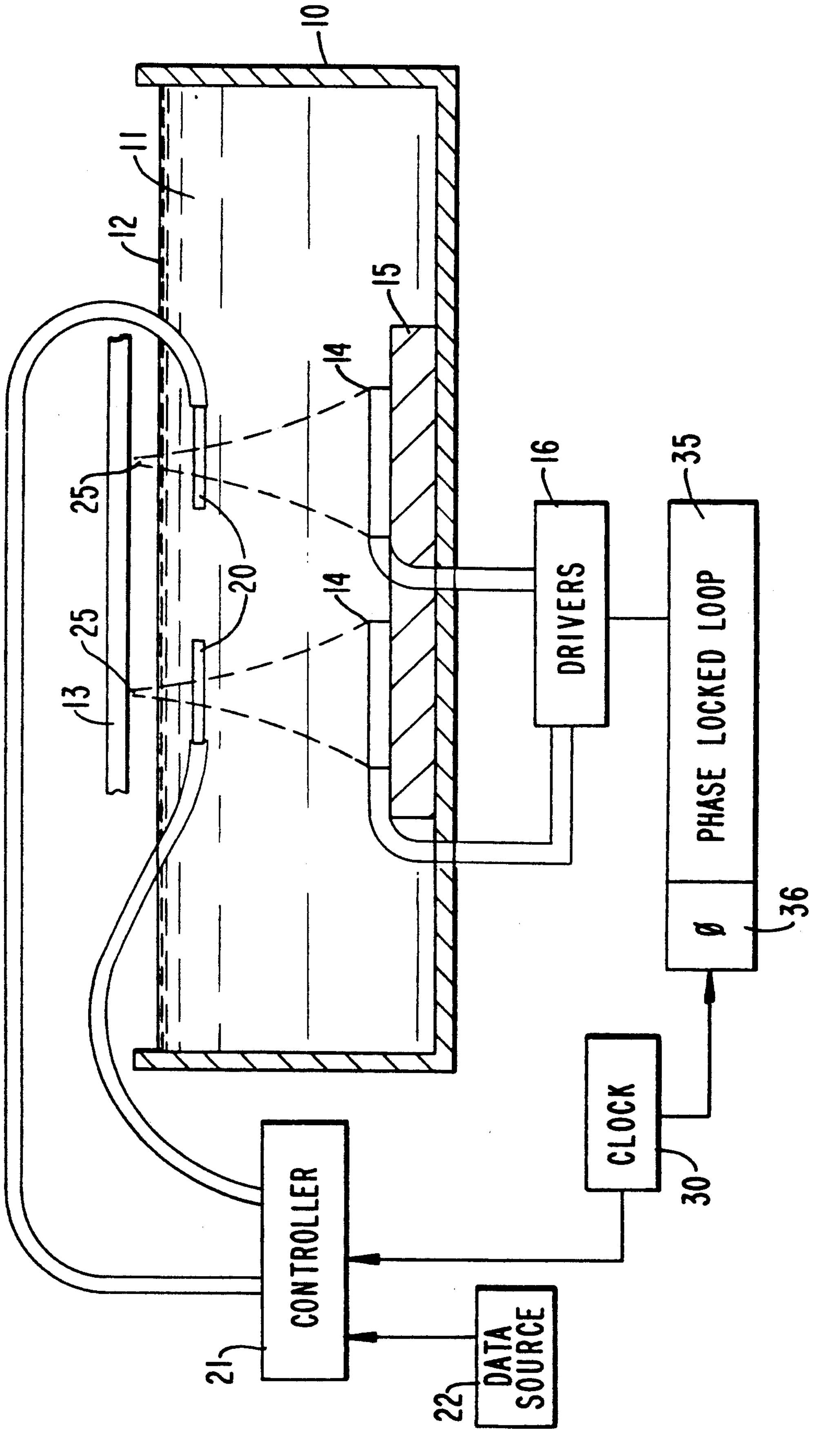
10
11
12
13
14
14
15
16
20
21
22
25
25
30
35
36
DRIVERS
PHASE LOCKED LOOP
Ø
CLOCK
CONTROLLER
DATA SOURCE

METHOD AND APPARATUS FOR SUPPRESSING CAPILLARY WAVES IN AN INK JET PRINTER

FIELD OF THE INVENTION

This invention relates to ink jet printers, and more in particular to a method and apparatus for suppressing capillary waves in ink jet printers, especially acoustic ink printers.

BACKGROUND OF THE INVENTION

Ink jet printers generally function in one of two modes: continuous stream or drop-on-demand. Ultrasonic printheads have been described in detail in a number of commonly-owned U.S. Patents, including Pat. Nos. 4,719,476 and 4,719,480, whose contents are herein incorporated by reference.

These patents describe the generation of capillary surface waves on the surface of the ink by various means, such as acoustically, mechanically, thermally, or electrically, to periodically perturb the free surface of a volume of liquid ink at a suitably high excitation frequency $f_c$. If the amplitude of this oscillating pressure equals or exceeds a critical "onset" amplitude level, one or more standing capillary waves are generated on the free surface of the liquid ink. Capillary waves, as defined therein, are waves which travel on the surface of a liquid in a region where the surface tension of the liquid is such a dominating factor that gravitation forces have negligible effect on the wave behavior. The patents further discuss the production of the waves by parametric excitation of the liquid, so that their frequency $f_{sc}$ is equal to one half of the excitation frequency ($f_{sc}=f_c/2$). The capillary surface waves are periodic and generally sinusoidal at lower amplitudes, and they retain their periodicity but become non-sinusoidal as their amplitude is increased.

The systems of these patents provide acoustic transducers immersed in the liquid for generating a standing capillary wave at the surface of the ink, and addressing mechanisms for selecting the sites from which droplets are to be ejected, to locally alter the surface properties of selected crests at those sites. For example, the local surface pressure acting on the selected crests or the local surface tension of the liquid within the selected crests may be changed in order to cause droplets to be ejected in a controlled manner from the selected crests.

Acoustic ink printers are also disclosed in commonly-owned United States patent No. 4,748,461, the contents of which are also incorporated herein by reference. This patent discusses the generation of radially directed capillary waves at the surface of the liquid ink, by an electrode structure, to coherently interact with the capillary waves generated by the focussed output of an acoustic generator immersed in the liquid, in order to enable the ejection of ink drops from the pool of liquid ink. In this arrangement, the maximum displacement of the electrodes from the acoustic wave center is limited by the damping of the capillary waves resulting from the viscosity of the liquid.

In an acoustic ink printer, the ejection of droplets from the surface of the liquid ink has also been found to result in the generation of capillary waves that radiate, for example, from the locus on the surface of the liquid from which the droplet was ejected. It has further been found that the repetition rate of the printhead transducers is limited by the necessity that these capillary waves must die out before a new droplet may be ejected.

SUMMARY OF THE INVENTION

The invention is therefore directed to a method and apparatus for increasing the repetition rate of ejection of droplets in an acoustic ink printer.

Briefly stated, in accordance with the invention, the pool of ink is subjected to pressure waves at twice the maximum repetition rate of emmission of the ink droplets. This excites capillary waves in the surface of the ink at half the pumping frequency, i.e. at the frequency of pressure waves applied to the ink, to destructively interfere with the capillary waves induced by the emission of the droplets. This destructive interference permits a faster repetition rate by the transducer.

In accordance with the invention, the pumping excites capillary waves on the surface of the liquid at the same frequency as those excited by the process of droplet ejection., i.e. at ½ the pumping frequency. These waves can interfere with each other either constructively, or destructively. The choice of addition or subtraction is dependent upon the phase of the pumping pressure wave. The phase of the pumping wave, in accordance with the invention, is locked to that of the repetition frequency of the droplet generator. The use of a phase-locked system enables the selection of a phase that will produce destructive interference between the two capillary waves on the surface of the liquid. With such a phase selection, the capillary waves will never grow in amplitude.

The invention is also to directed to the method for suppressing these undesired waves.

BRIEF DESCRIPTION OF THE DRAWING

In order that the invention may be more clearly understood, it will now be disclosed in greater detail with reference to the accompanying drawing, wherein:

The single figure of the drawings is a schematic illustration of one embodiment of an acoustic ink printing system in accordance with the invention.

DETAILED DISCLOSURE OF THE INVENTION

Ink jet printers, such as acoustic ink printers, conventionally are provided with an arrangement for confining liquid ink, in order to subject the ink to pressure waves. Thus, as illustrated in the drawing, a container 10 is provided for containing a pool of liquid ink 11 having an upper surface 12. A sheet 13 upon which data or images are to be printed is spaced above the surface 12. As further illustrated in the drawing, one or more acoustic transducers 14 are mounted on a substrate 15, immersed in the ink, at the bottom of the container 10. The transducers are driven by conventional drivers 16 to excite the ink to a sub-threshold, incipient energy level for droplet emission, i.e. to a level insufficient to destabilize the surface of the ink for droplet emission. The acoustic transducers may be provided with conventional means to focus their energy generally at the surface 12 of the ink.

Ink jet printers of the above type are also generally provided with a droplet emission control arrangement, such as electrode structures 20 connected to be driven by a controller 21. The electrode structure may be immersed in the ink, or it may be mounted above the surface of the ink. The controller is responsive to the input of data from a source 22 to apply voltages to the electrode structures 20, to selectively destabilize the surface of the liquid ink and thereby cause the emission of droplets 25 of ink to the sheet 13.

The above description is representative of one known technique for ink jet printing, and it will be understood that the invention is not limited to this type of structure. For example only, the ink may be confined to flow in the region of the transducers, and other techniques, such as heating, may be employed to selectively destabilize the surface of the ink. Similarly, other known techniques may be employed to generate standing waves on the surface of the ink.

It has now been found that the emission of droplets 25 from the surface of the ink affects the generation of capillary waves on the surface of the ink, radiating from the locus of the ejection. In order to avoid interference between these latter discussed capillary waves and the later emission of droplets, it has been found to be necessary for the capillary waves to die out before the next droplet is ejected from that locus. The damping is conventionally caused only by the viscosity of the liquid ink. As a result, the maximum repetition rate at which the controller 21 is permitted to control the emission of droplets is limited.

In accordance with the invention, such limitation on the maximum repetition rate of emission of the droplets is overcome by controlling the frequency and phase of the pumping pressure wave generated by the acoustic transducers to generate capillary waves at the surface of the liquid ink that destructively interferes with the capillary waves caused by droplet emission. Such destructive interference may be effected by controlling the frequency of the pumping pressure wave to be twice the maximum repetition rate of droplet emission from the respective locus of emission.

For example, as illustrated in the drawing, the maximum repetition rate of emission, as controlled by the controller 21, may be determined by the frequency f of the output of a clock 30. In other words, the controller may output emission signals to the respective electrode structures 20 at the maximum rate f, or at lower periodic or aperiodic rates synchronized with cycles of the output of the clock 30.

In addition, the acoustic transducers 14 are controlled by the driver 16 to generate a pressure wave at the frequency 2f. In order to effect the generation of the pressure wave at such a frequency, an output of the frequency f from the clock 30 may be doubled, for example in a conventional phase-locked loop circuit 35, for application to the drivers 16. In addition, in order to enable adjustment of the phase of the drive from the drivers 16, a conventional adjustable phase shifting circuit 36 may be connected, for example between the output of the clock and the input of the phase-locked loop. It will be apparent of course, that the invention is not limited to this technique for multiplying the frequency output of the clock and adjusting the phase of the pressure wave. The adjustable phase shifting circuit enables the adjustment of the phase of the pressure wave in order to effect the most rapid die out of the capillary waves.

While the invention has been disclosed and described with reference to a single embodiment, it will be apparent that variations and modification may be made therein, and it is therefore intended in the following claims to cover each such variation and modification as falls within the true spirit and scope of the invention.

What is claimed is:

1. In an ink jet printer comprising means for confining a liquid ink to have a free surface, means for exciting a capillary wave on the surface of the liquid ink in the confining means, and control means destabilizing the ink subject to said capillary wave to effect an ejection of ink droplets from the surface of the liquid ink, said control means having an output with a given maximum repetition rate, the improvement wherein said means for exciting the pressure wave comprises means for applying a pressure wave to the liquid ink in said confining means that has a frequency twice said maximum repetition rate, whereby capillary waves resulting from the ejection of said droplets are suppressed.

2. The ink jet printer of claim 1 wherein said means for applying the pressure wave to the liquid ink in said confining means comprises an acoustic transducer in said confining means.

3. The ink jet printer of claim 1 comprising clock means connected to control said maximum repetition rate, means responsive to said clock means for generating a control signal having said frequency twice said maximum repetition rate, and means for controlling said means for applying the pressure wave with said control signal.

4. The ink jet printer of claim 3 further comprising means for adjustably controlling a relative phase of said clock means and said pressure wave.

5. The ink jet printer of claim 3 wherein said means for generating a control signal comprises a phase-locked loop.

6. In an acoustic ink printer having an acoustic transducer for generating a pressure wave in a body of liquid ink to an incipient subthreshold level for droplet an ink emission and means for effecting the emission of the ink droplet from the surface of said liquid ink selectively destabilizing said ink in a region subjected to said pressure wave, the improvement wherein said means comprises means for destabilizing said ink in said region at rates up to a predetermined maximum repetition rate, and further comprising means for energizing said acoustic transducer to apply the pressure wave to said liquid ink at a frequency that is twice said repetition rate.

7. The acoustic ink printer of claim 6 further comprising means for adjusting a phase of the pressure wave generated by said acoustic generator with respect to the destabilization of said ink.

8. The acoustic ink printer of claim 7 further comprising a clock generator connected to control said maximum repetition rate, and frequency multiplying means coupled to said clock generator for energizing said acoustic transducer.

9. In a method for controlling an ink jet printer comprising the steps of applying pressure wave to a pool of liquid ink to excite a capillary wave on a surface of the liquid ink, and destabilizing the ink subject to the pressure wave to effect an ejection of droplets of ink from the surface of the liquid ink, wherein the destabilizing is effected at a rate lower than or equal to a maximum repetition rate, the improvement wherein said step of applying the pressure wave to the pool of the liquid ink comprises applying the pressure wave to said liquid ink at a frequency that is twice said repetition rate, whereby capillary waves resulting from the ejection of said droplets are suppressed.

10. The method of claim 9 wherein said step of applying a pressure wave to the pool comprises energizing an acoustic transducer in said pool at the frequency, twice said maximum repetition rate.

11. The method of claim 10 further comprising the step of adjusting a relative phase of an output of said acoustic transducer and the destabilizing of said ink until capillary waves at the surface of said ink produced by said pressure wave destructively interfere with capillary waves at said surface resulting from the emission of one of said droplets of ink therefrom.

* * * * *